US006472864B1

United States Patent
Emo et al.

(10) Patent No.: US 6,472,864 B1
(45) Date of Patent: Oct. 29, 2002

(54) MOTION AND TILT ANGLE SENSOR

(75) Inventors: Bruce D. Emo; James M. Jones; Paul J. Poisson, all of Boulder, CO (US)

(73) Assignee: Mobile Storage Technology, Inc., Milpitas, CA (US)

(*) Notice: Subject to any disclaimer, the term of this patent is extended or adjusted under 35 U.S.C. 154(b) by 0 days.

(21) Appl. No.: 09/546,996

(22) Filed: Apr. 11, 2000

(51) Int. Cl.[7] .............................. G01B 7/14; G01B 7/30; G01P 15/11; G01C 9/06
(52) U.S. Cl. ................. 324/207.16; 73/493; 73/514.31; 324/207.22; 33/366.11; 200/61.45 R
(58) Field of Search ................. 324/207.15, 207.16, 324/207.17, 207.18, 207.19, 207.26, 234, 239, 260, 262, 207.22; 340/669, 686, 689, 467; 33/366.11, 366.13, 366.24, 366.25; 116/203, 215; 73/514.06, 514.08, 514.31, 493; 200/61.45 R, 61.52

(56) References Cited

U.S. PATENT DOCUMENTS

| | | | | |
|---|---|---|---|---|
| 4,084,443 A | * | 4/1978 | Walter ....................... 73/517 R |
| 4,311,051 A | * | 1/1982 | Eon et al. .................. 73/517 R |
| 4,365,513 A | * | 12/1982 | Iwasaki ..................... 73/517 R |
| 4,843,877 A | * | 7/1989 | Kushida et al. ............ 73/517 R |
| 6,148,669 A | * | 11/2000 | Roest ......................... 73/14.31 |

* cited by examiner

*Primary Examiner*—Edward Lefkowitz
*Assistant Examiner*—Reena Aurora
(74) *Attorney, Agent, or Firm*—Skjerven Morrill LLP; Christopher B. Allenby

(57) ABSTRACT

A mass moves within a bore defined in a body. During normal operation the axis of the bore is approximately vertical, so that the mass rests at the bottom. A magnet is positioned adjacent the top of the bore and imparts an upwards force on the mass that is less than the downwards force on the mass upwards force on the mass that is less than the downwards force on the mass from gravity. A coil is positioned adjacent the bottom of the bore. When the body is dropped, or tilted beyond a critical angle from vertical, the force from the magnet causes the mass to move upwards in the bore. The upwards movement is sensed as a change in the coil's inductance.

31 Claims, 9 Drawing Sheets

MOTION AND TILT ANGLE SENSOR

BACKGROUND

1. Field of invention

The invention relates to motion sensors, and in particular to a sensor that can detect dropping or tilting of an electronic device.

2. Related art

Present portable computers (e.g., laptop, palmtop, other electronic equipment that includes a microprocessor/microcontroller) and other electronic equipment are subject to extreme mechanical shock during operation. For example, the user may inadvertently drop a laptop computer during operation.

Disk drive units are especially vulnerable to mechanical shock. Proper drive operation depends on the drive machinery maintaining a very small gap between the read/write head and the recording material on the disk surface. When shock causes the read/write head to contact the disk, the head may be damaged and recording material removed from the disk. The contact may irretrievably destroy the head and/or the data, and render the drive inoperable. Thus it is important to predict mechanical shock so that the drive mechanism can position the head to avoid data surface contact (e.g., "unload" the head by moving it outside the disk's outer circumference (on a dynamically loaded drive), or position the head to the inner diameter within a data free landing zone (on a start/stop drive).

One source of shock is the sharp landing deceleration after a computer is dropped. The computer and its components briefly experience near zero acceleration (zero-G) during the immediately preceding free fall. A near zero-G sensor thus predicts a mechanical shock after a drop. In most cases a free falling computer will first strike a landing surface at a corner. A corner-first impact somewhat mitigates the shock to the computer because of the mechanical compliance of the typically plastic computer housing. The most severe shock occurs when the computer lands flat.

The computer may land flat after a free fall drop, or more likely after the user lifts one side of the computer and allows the side to slip from the hand. The computer pivots around the housing portion resting on the landing surface and the computer base strikes flat on the landing surface. This tilt and release type of drop is more difficult to detect than a free fall drop, hence the terminating shock pulse is more difficult to predict.

One method of anticipating the shock occurring after a tilt and release drop is to sense the computer's tilt angle. A critical tilt angle is the angle above which the landing shock from the tilt and release drop exceeds the operational shock tolerance of a computer component (e.g., disk drive). When a tilt sensor detects such a predetermined critical angle, the computer may act to protect the disk drive from the potential shock if the tilt precedes a drop. When the tilt angle sensor detects that the computer housing tilt angle is below the predetermined angle, the computer returns the disk drive to normal operation. Detecting the computer tilt angle does not predict an imminent shock, but guards against the possibility. component protection based on tilt angle will have minimal impact on operation. For example, operators have difficulty typing at large keyboard angles (e.g., 30 degrees or more) and so drive access caused by the user's keyboard inputs will be rare at higher tilt angles. Cautionary protective actions taken as the computer tilts above and below the critical will therefore not appreciably affect drive access performance during most computer operations.

Gyroscopic sensors detect only rotational acceleration, not static tilt. Rotation (or rotational acceleration) may or may not occur during a drop, and so a single gyroscope cannot act as a reliable drop predictor. Static tilt could be inferred by integration of rotational acceleration, but this approach would be very prone to errors resulting from, for example, low output signal levels for small movements, zero drift, and noise. Since gyroscopes have a single axis of sensitivity, three mutually perpendicular gyroscopes, along with their associated circuitry, would be required to cover the three orthogonal axes. This approach is expensive and consumes excess volume in small-scale equipment.

What is required is a small, inexpensive sensor that combines both near zero-G and tilt angle detection.

SUMMARY OF INVENTION

A bore is defined along an axis in a body. A mass subject to a magnetic attraction is placed within the bore and can travel a limited distance. During normal operation, the axis is approximately vertical so that the mass rests at one end (bottom) of the bore. A magnet is placed adjacent the opposite end (top) of the bore and imparts an upward attractive force on the mass. The magnitude of this upward force is established at a value that is less than the weight of the mass. An electrically conductive pickup coil (inductor) is placed near the end of the bore at which the mass normally rests. In some embodiments the coil is a conductive wire coil wound centered on the axis.

When the sensor experiences free-fall (drop), the gravitational attraction acting on both the sensor body and the mass within the bore are equal. The only attraction then acting on the mass is the magnetic attraction, and consequently the mass accelerates toward the magnet end of the bore and away from the inductive pickup coil. The mass movement causes an inductance change in the coil that is sensed by a detector circuit. The detector circuit outputs a signal that indicates the mass has moved, accordingly signifying that the body (and the device in which the sensor body is mounted) has been dropped. The output signal is used to trigger head movement to a position at which no damage will occur upon landing shock.

In a similar way, the mass moves upwards in the bore when the axis of the bore is tilted from the vertical beyond a certain critical angle. At that critical angle, the force from the magnet along the axis exceeds the component opposing force of gravity on the mass, and therefore the mass moves towards the magnet and away from the pickup coil. The detector circuit outputs a signal signifying that tilt beyond the critical angle has occurred.

DETAILED DESCRIPTION

Identical numbers shown in the accompanying drawings represent the same or a substantially similar element.

Figure 1:
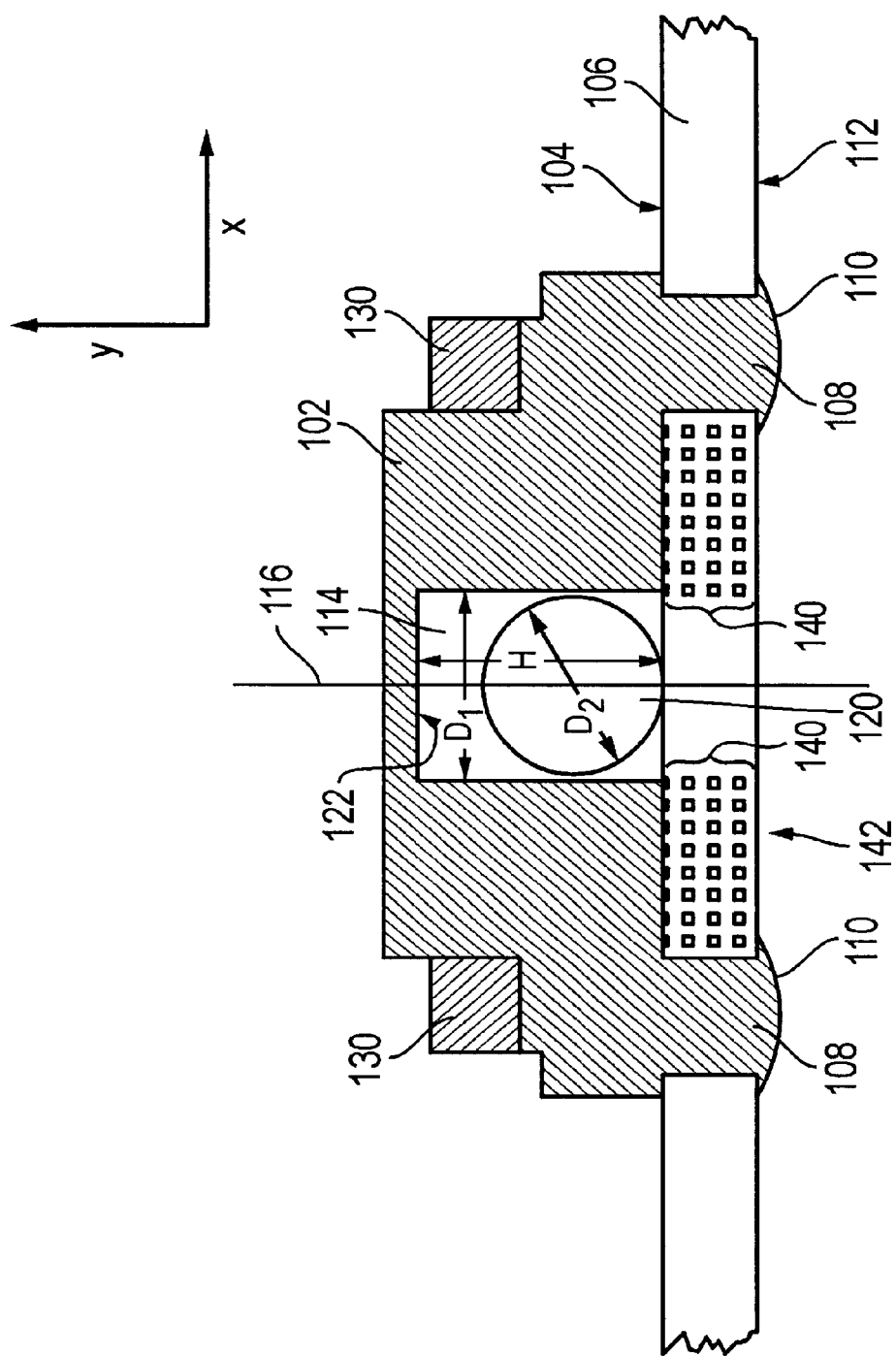
FIG. 1 is a cross-sectional view of one embodiment.

FIG. 1 is a cross-sectional view of an embodiment. Sensor body 102 is placed on surface 104 of printed circuit board (PCB) 106 that is, for example, a printed circuit board in a portable computer's hard disk drive. As shown, body 102 has two posts 108 that extend through holes in PCB 106. In the embodiment shown, body 102 and posts 108 are integrally formed and made of conventional plastic. Body 102 is held secure against surface 104 by conventionally melting portions 110 against surface 112 of PCB 106. Other embodiments hold body 102 secure against PCB 106 using various other conventional methods such as small screws, bolts, or adhesives. In one embodiment body 120 is approximately 3.0 millimeters (mm) high and 9.0 mm wide, allowing it to be placed in portable electronic devices.

Cylindrical bore 114 is defined around longitudinal axis 116 in body 102. As shown, bore 114 has a diameter D1 and a height H. In this embodiment, diameter D1 is approximately 1.6 mm and height H is approximately 2.9 mm (1.3 mm movement in the bore).

Mass 120 is positioned in bore 114. In the embodiment shown, mass 120 is a sphere with diameter D2. For example, in one embodiment mass 120 is a conventional 1/16-inch diameter 400 series stainless steel ball bearing. 400 series stainless steel is chosen for its soft magnetic properties, used as described below. Mass 120 moves freely within bore 114 and its movement is limited by surface 122 at one end and by PCB 106 at the other end. Other embodiments may limit the movement using any suitable mechanical configuration.

Magnet 130 is fitted around the top portion of body 102. As shown, magnet 130 is ring-shaped and is a conventional grade 1 ceramic magnet. In one embodiment the field strength of magnet 130 is 1900 Oersteds ($H_c$) and 2200 Gauss ($B_r$). Magnet 130 imparts an upwards acceleration on mass 120 in the y-direction, as shown by the accompanying axes, that is approximately one-half the magnitude of earth's gravity (1.0 G). Thus, in the resting position shown in FIG. 1, mass 120 is subject to a net acceleration of approximately 0.5 G. Details of the forces on mass 120 are discussed below. Alternatively, an electromagnet could be substituted for magnet 130, instead of using a permanent magnet.

Figure 2A:
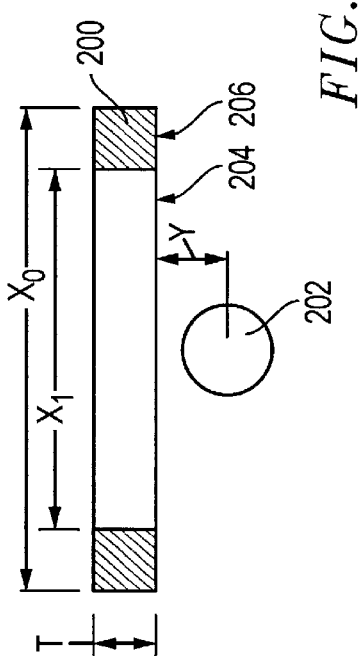
FIG. 2A is a diagram showing a ring magnet and a mass.
Figure 2B:
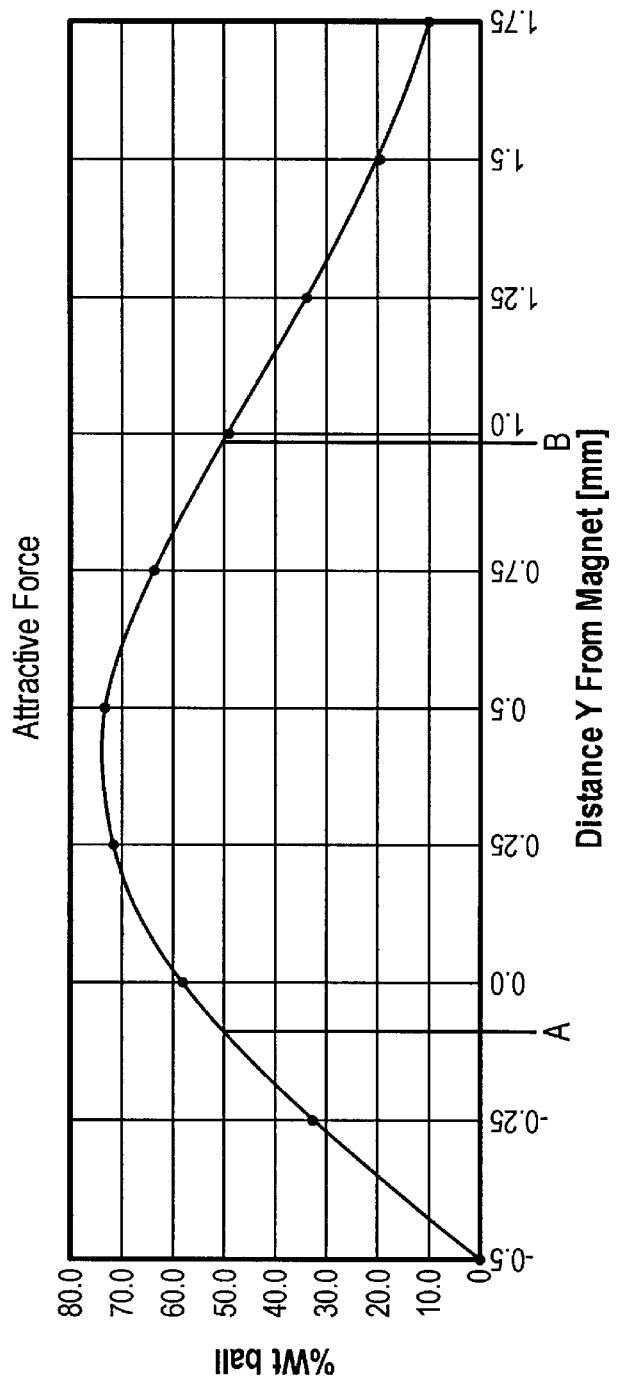
FIG. 2B is a chart showing the force and distance relationship between the magnet and the mass shown in FIG. 2A.

FIGS. 2A and 2B illustrate the force and distance relationship between ring magnet 200 and mass 202 in one embodiment of the invention. As shown in FIG. 2A, ring magnet 200 has an 8.0 mm outer diameter $X_o$, a 6.0 mm inner diameter $X_I$, and a 1.0 mm thickness T. The distance Y is between the center of mass 202 and the plane 204 defined by the lower surface 206 of ring magnet 200. Mass 202 is a conventional 1/16 inch (1.59 mm) diameter spherical ball bearing weighing 0.01633 gram.

FIG. 2B is a plot showing how the attractive force acting on mass 202, as a percent weight of mass 202, varies with distance Y from magnet 200. As shown in FIG. 2B, the attractive force on mass 200 exceeds 50 percent between points A (approximately −0.1 mm) and B (approximately 0.97 mm), a total positional displacement of approximately 1.1 mm. Referring again to FIG. 1, bore 114 is defined in some embodiments so that regardless of mass 120's position, mass 120 experiences at least a 50 percent weight attractive force from magnet 130. In one embodiment the vertical movement of the 1.59 mm spherical mass is approximately 1.3 mm.

FIG. 2B shows the attractive force from the magnet varying from approximately 50 to 75 percent of the ball's weight. In other embodiments the range may be different. The magnetic attractive force should be less than 100 percent to prevent the ball from lifting, and greater than 0.0 percent so that the ball lifts upon drop or tilt. Near 100 percent, however, false triggering will occur for slight sensor movements, and sensitivity decreases near 0.0 percent. Accordingly, 50 percent is chosen for the ball's resting position, but other ranges may be used for desired sensitivity characteristics. Conceivably, percentages outside the 0–100 range may be chosen if sensor accelerations other than drop or tilt are to be sensed.

Figure 3:
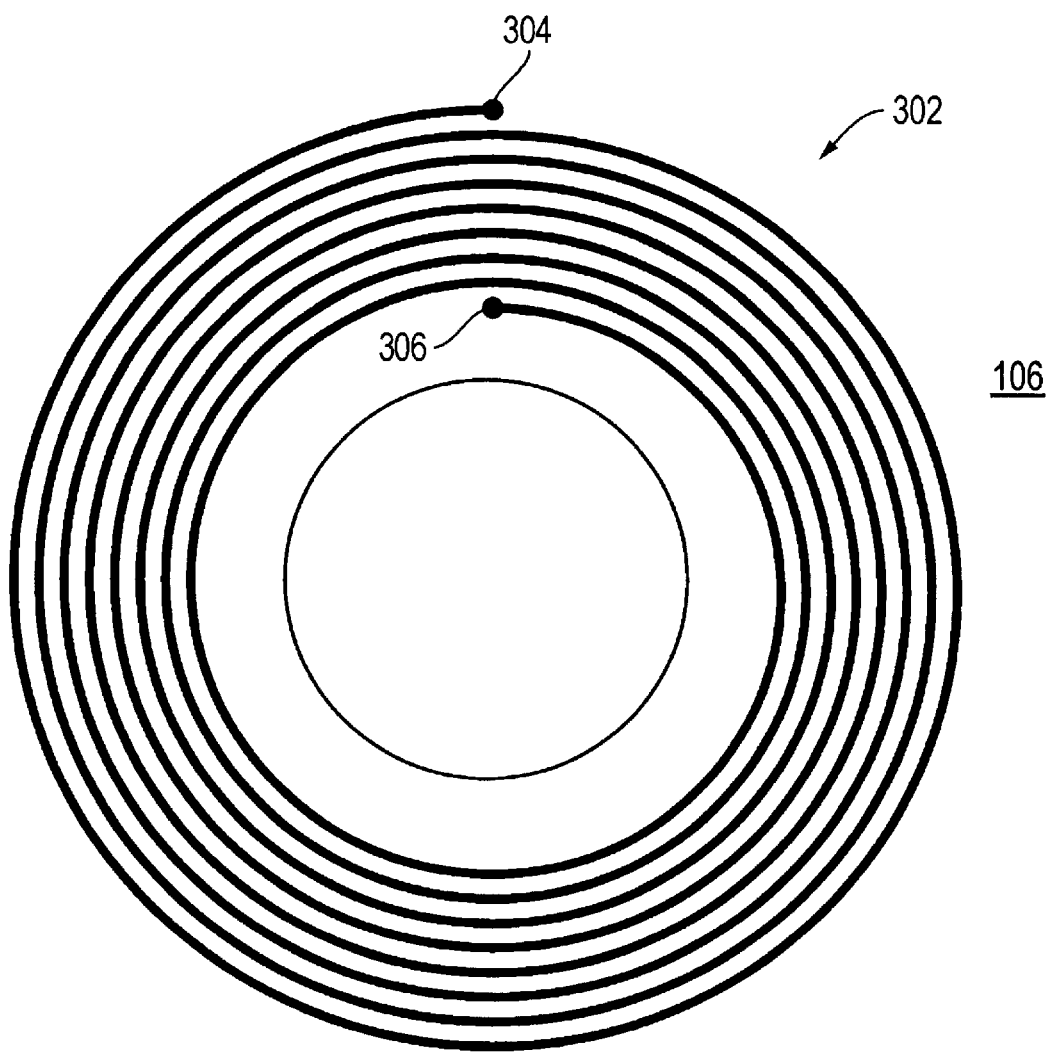
FIG. 3 is a plan view of a coil defined on a printed circuit board.

When the sensor is dropped and free-falls, mass 120 moves upward in bore 114 along axis 116. This upward motion causes an inductance change in electrically conductive inductive pickup coil 140 positioned adjacent one end of the bore near the normal resting position of mass 120. FIG. 1 shows the cross section of four spiral electrically conductive coils 140 positioned in PCB 106 and centered around axis 116. In the embodiment shown, PCB 106 is a conventional 4-layer PCB and one spiral is defined as an electrically conductive trace in the conductive layer for each of the four PCB layers. FIG. 3 is a top view of spiral coil 302 that is an example of one conductive trace etched as a spiral coil. Terminals 304 and 306 are placed at each end of coil 302. In FIG. 1, the four spiral coils are shown stacked above one another. The end terminals of the coils are electrically interconnected between each adjoining layer to form a single conductive coil 142 that is electrically connected to an inductance sensor. Conductive coil 142 is centered on axis 116. Eight (8) coils windings are shown per layer due to present limitations defining the conductive traces at the scale of this embodiment, thus 32 total windings are shown. The coil windings shown are illustrative. The number of windings N determines the coil's inductance which in one embodiment is adjusted to tune an L-C tank circuit to the excitation signal frequency, as discussed below.

During sensor operation, coil 142 is conventionally excited with a high to very high frequency alternating current (AC) signal from a conventional voltage source. As mass 120 moves within bore 114, coil 142's inductance changes. The change in inductance is detected by the detector circuit described below.

Figure 4:
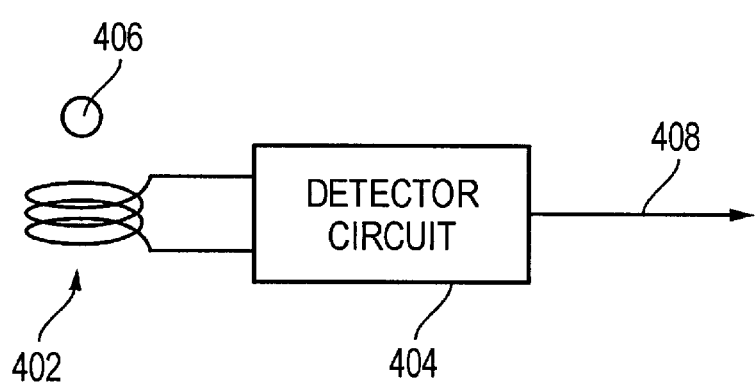
FIG. 4 is a schematic diagram illustrating a detector circuit coupled to a coil.

FIG. 4 is a schematic diagram showing a detector circuit electrically coupled to the coil used to sense movement of the mass. As shown, the two ends of coil 402 (e.g., coil 140 illustrated in FIG. 1) are coupled to detector circuit 404 that is configured to sense a change in the coil's impedance as mass 406 moves. When circuit 404 detects an impedance change, it outputs signal 408.

Figure 5:
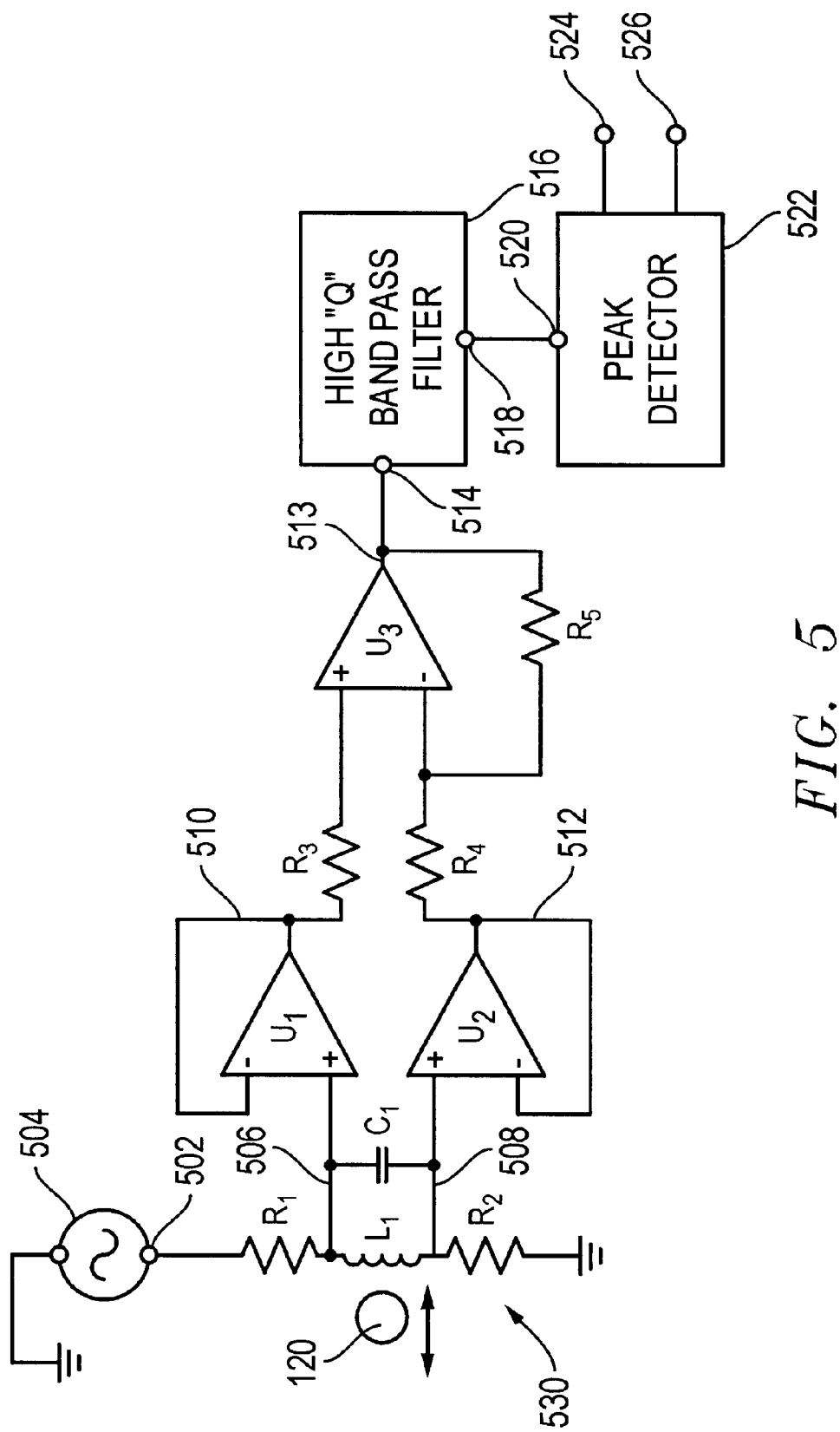
FIG. 5 is a schematic diagram of an inductive pickup circuit.

FIG. 5 is a schematic diagram of an inductive pickup circuit. As shown, terminal 502 of signal generator 504 is coupled to one terminal of resistor $R_1$. The other terminal of resistor $R_1$ is coupled at node 506 to inductor $L_1$, capacitor $C_1$, and the non-inverting terminal of operational amplifier (op-amp) $U_1$. The opposite ends of inductor $L_1$ and capacitor $C_1$ are coupled at node 508 which is coupled to the non-inverting terminal of op-amp $U_2$. Node 508 is coupled to ground through resistor $R_2$. The output of op-amp $U_1$, the inverting terminal of op-amp $U_1$, and one terminal of resistor $R_3$ are coupled at node 510. In a similar manner, the output of op-amp $U_2$, the inverting terminal of op-amp $U_2$, and one terminal of resistor $R_4$ are coupled at node 512. The opposite terminals of resistors $R_3$ and $R_4$ are coupled to the non-inverting and inverting terminals, respectively, of op-amp $U_3$. Resistor $R_5$ is coupled between the output and inverting terminals of op-amp $U_3$. Output terminal 513 of op-amp $U_3$ is also coupled to input terminal 514 of conventional high "Q" band pass filter 516 which provides an output signal on output terminal 518. In some embodiments terminal 518 is coupled to input terminal 520 of peak detector 520 that detects the amplitude of, for example, a sinusoid signal from the band pass filter. In the embodiment shown, one signal is output on output terminal 524 when mass 120 is in its normal resting position, and a second signal is output on output terminal 526 when mass 120 moves. In other embodiments a signal level is varied between two amplitudes on a single output terminal of the peak detector.

Inductor $L_1$ is analogous to coil 142. shown in FIG. 1. Mass 120 is positioned in proximity to inductor $L_1$ and is movable as shown by the double-headed arrow. Generator 504 provides on terminal 502 an electric excitation signal having frequency $f_e$. In one embodiment the signal is taken from disk drive circuitry in a portable computer hard disk. When mass 120 is closest to inductor $L_1$, $L_1$ exhibits its highest value and L-C circuit 530 will have its lowest natural frequency. The natural resonant frequency $f_n$ of L-C tank circuit 530, with mass 120 in the closest position, is tuned to match frequency $f_e$ by adjusting the capacitor $C_1$, value $$\left(f_n = \frac{1}{2\pi\sqrt{LC}}\right).$$

The frequency of high "Q" band pass filter 516 is also tuned to frequency $f_e$. Op-amps $U_1$, $U_2$, and $U_3$ act as buffers.

When the mass is closest to inductor L1, the resonance of L-C circuit 530 amplifies the excitation signal and outputs a very large (e.g., 20–30 dB at the tuned frequency) signal. Band pass filter 516 passes the output signal through for peak detection (amplitude). When mass 120 moves away from inductor L1, however, the inductance falls, the natural frequency of L-C circuit 530 increases, and the amplification of the excitation frequency drops significantly. Filter 516 continues to pass signals at the tuned frequency, and so the output signal amplitude of the circuit is significantly lower. The drop in output amplitude indicates drop or tilt of the sensor.

The resonant frequency gain of the excitation signal when the natural L-C circuit frequency and excitation signal frequency are the same is adequate for sensing without using a band pass filter. The filter is added as a precaution against noise. In some embodiments filter 516 is omitted and the indication signal is taken directly from output terminal 513 of op-amp $U_3$. The detector circuit shown in FIG. 5 is illustrative and persons skilled in the art will be able to construct such a detector circuit, and other suitable detector circuits, in light of this disclosure.

Figure 11:
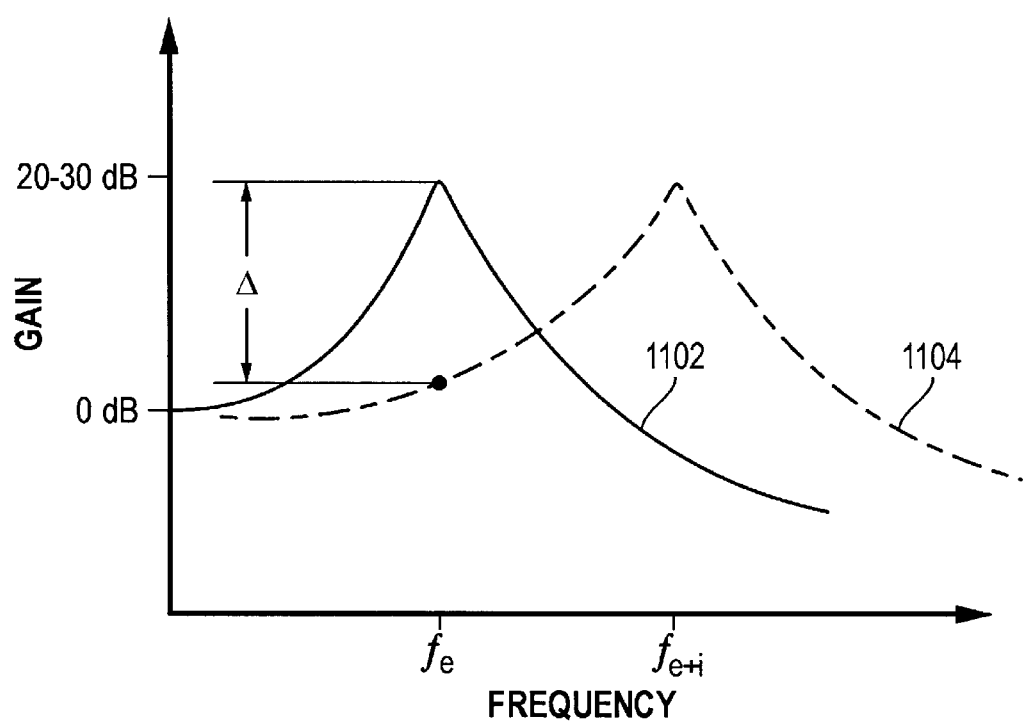
FIG. 11 is a graph illustrating signal output versus excitation signal frequency.

FIG. 11 is a graph illustrating signal amplitude output at, for example, output terminal 513 of op-amp $U_3$, versus excitation signal frequency (transfer, or gain function). Line 1102 indicates output with mass 120 in close proximity to coil $L_1$, peaking at $f_e$. Broken line 1104 indicates output with mass 120 displaced from coil $L_1$, peaking at a different frequency $f_{e+1}$. Thus the difference $\Delta$ represents the difference in signal output amplitude when the mass is displaced away from the inductive pickup coil to a position at which the L-C circuit is resonant at $f_{e+1}$.

Figure 6:
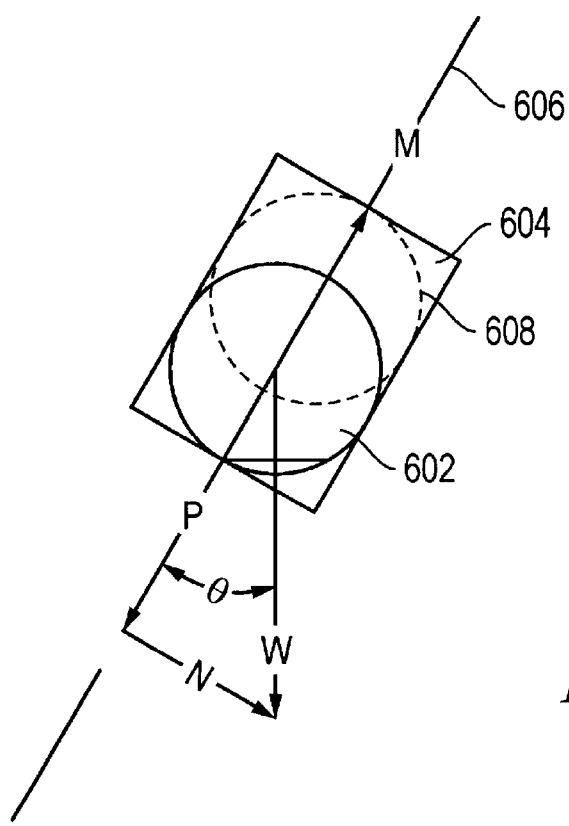
FIG. 6 is a diagram illustrating forces on a mass.

FIG. 6 is a diagram illustrating one embodiment acting as a tilt angle sensor. Mass 602 has weight W when at rest in bore 604. A magnet (not shown) exerts attractive magnetic force M on mass 602 along (parallel to) longitudinal axis 606 of bore 604. As axis 606 tilts from the vertical by angle $\theta$, component force P (Wcos$\theta$) parallel to force M gradually lessens.

Eventually, at some critical angle $\theta_C$, force M exceeds component force P and the magnet displaces mass 602 upwards in bore 604 to position 608. As described above, mass 602's movement causes an inductance change in a coil positioned around axis 606. As angle $\theta$ is reduced to less than angle $\theta_C$, mass 602 returns to its original position and again the sensor senses the inductance change. The critical angle $\theta_C$ is determined by adjusting the force M from the magnet as a percent of the weight of mass 602. For example, if the force M is 50 percent of the weight W of mass 602, the critical angle $\theta_C$ is 60° ($\cos^{-1}$ (0.5)=60°). Thus when the coil inductance changes as mass 602 moves beyond critical angle $\theta_C$, disk drive heads or other shock sensitive components may be moved to a protected position.

Figure 7:
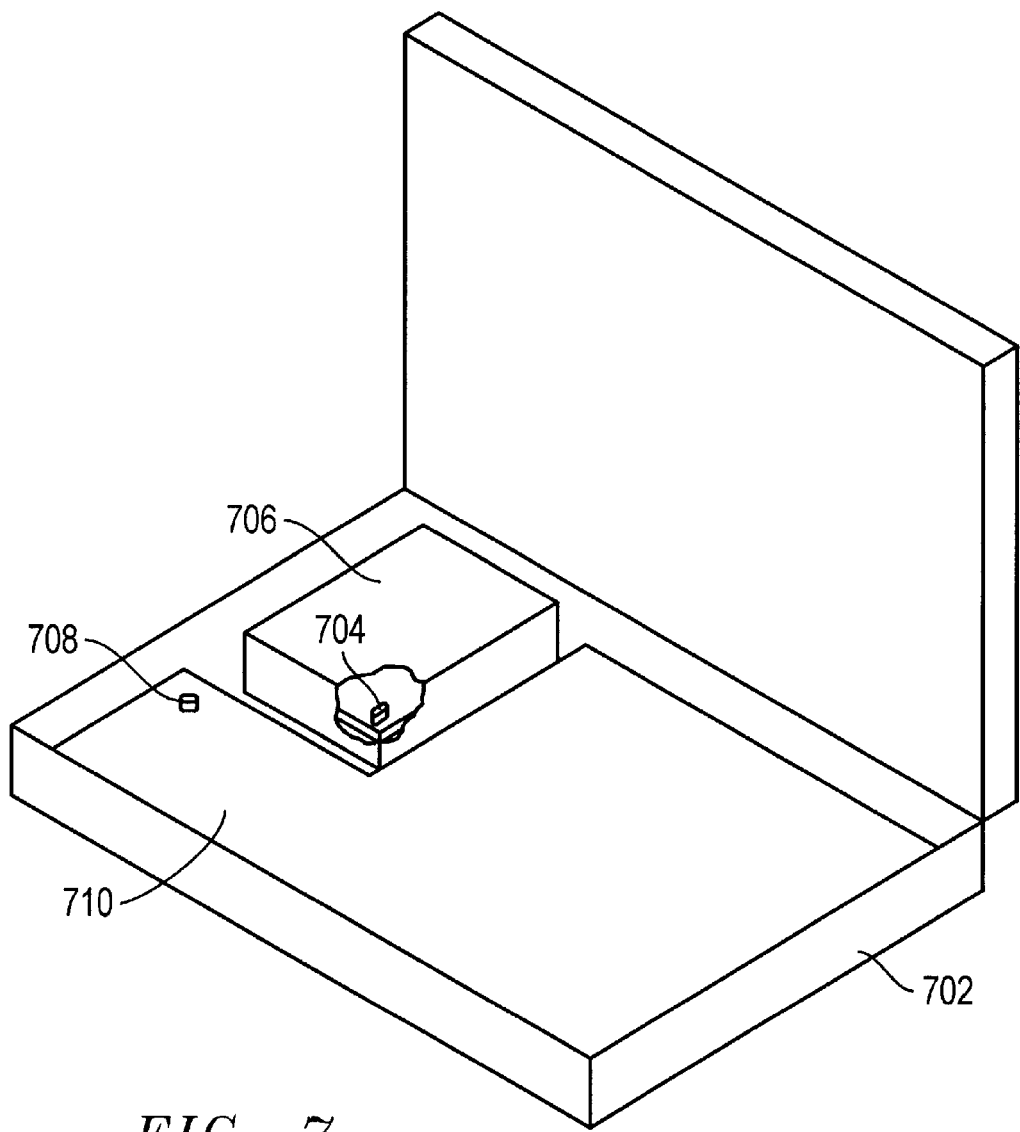
FIG. 7 is a perspective view of a portable computer.

FIG. 7 is a perspective view showing embodiments of the invention positioned in a portable computer housing 702. As shown, one embodiment 704 is positioned inside hard disk drive assembly housing 706. The drive assembly typically includes at least one disk configured to store information, a read/write head, and associated control circuits. Another embodiment 708 is placed on computer motherboard 710. These positions are illustrative. Embodiments may be placed in various locations, as well as in other electronic equipment.

Figure 8:
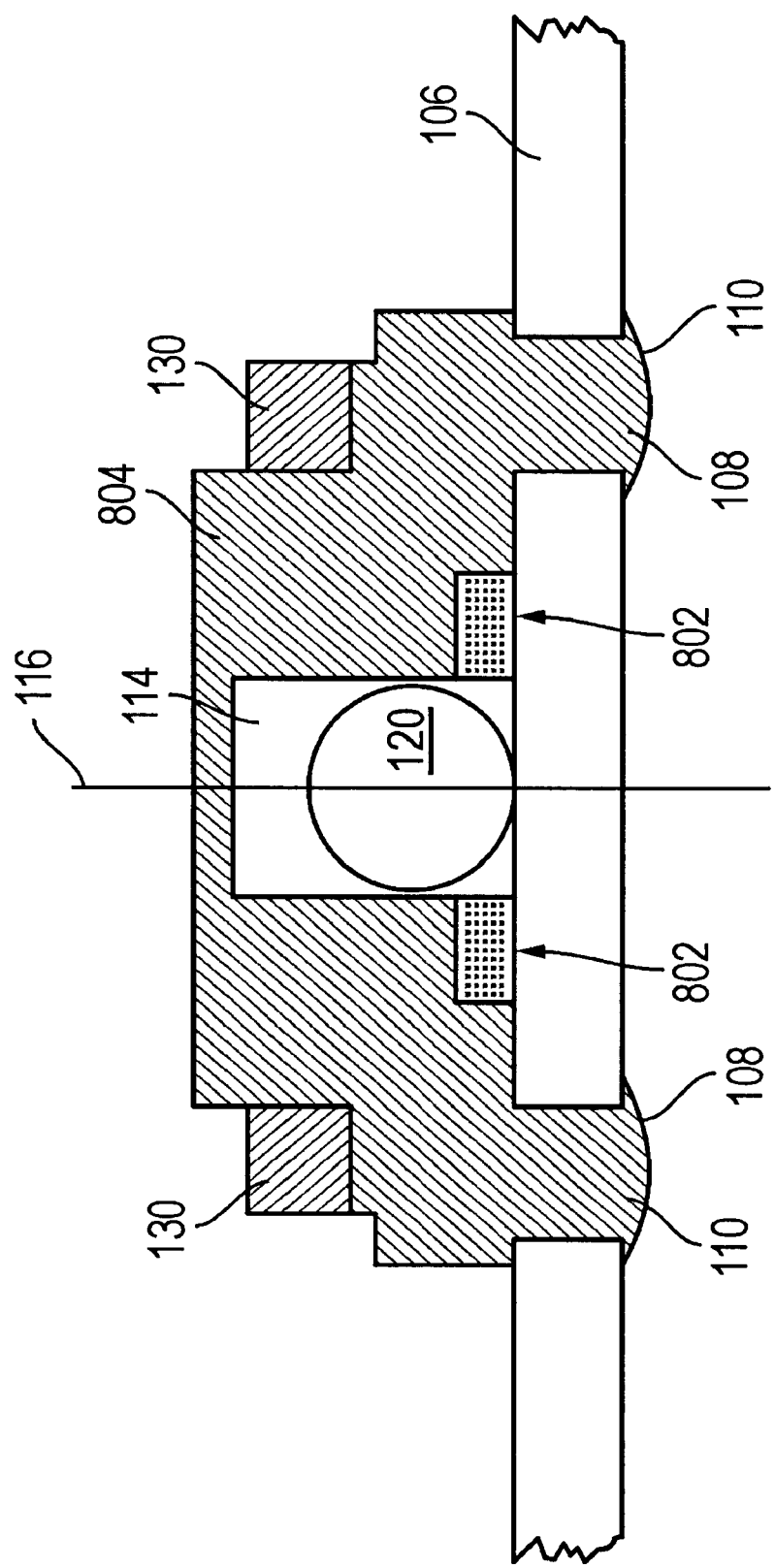
FIG. 8 is a cross-sectional view of a second embodiment.

FIG. 8 is a cross-sectional view of a second embodiment. This embodiment is similar to the one shown in FIG. 1, except that the inductor coil is in a different position. Etched coils described above are inexpensive, but located away from the mass. Positioning the coils closer to the mass allows lower excitation frequencies and currents to be used. In addition, wire coils yield a greater coil density than is presently achievable with current PCB etch technology. As shown, coil 802 has fifty windings (5 turns by 10 turns of 0.004-inch diameter wire) and is positioned in body 804, centered around axis 116. One excitation signal used with this embodiment is a 10 MHz square-wave signal. The coil positions and configurations are illustrative; other embodiments may use various alternate positions and coil configurations. For example, in this embodiment coil 802 is ring-shaped, however other configurations such as a disk shape or a rectangular shape positioned to the side of the bore could be used.

Figure 9:
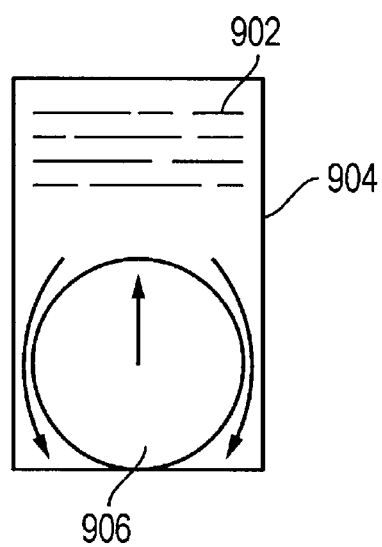
FIG. 9 is a cross-sectional view showing liquid flow.

Movement of the mass within the bore may be damped. FIG. 9 illustrates an embodiment in which liquid 902 is placed in bore 904 along with mass 906. As mass 906 moves, the liquid must pass between the surface of the mass and the walls of the bore (shown by the curved arrows), thus slowing the acceleration of the mass.

Figure 10:
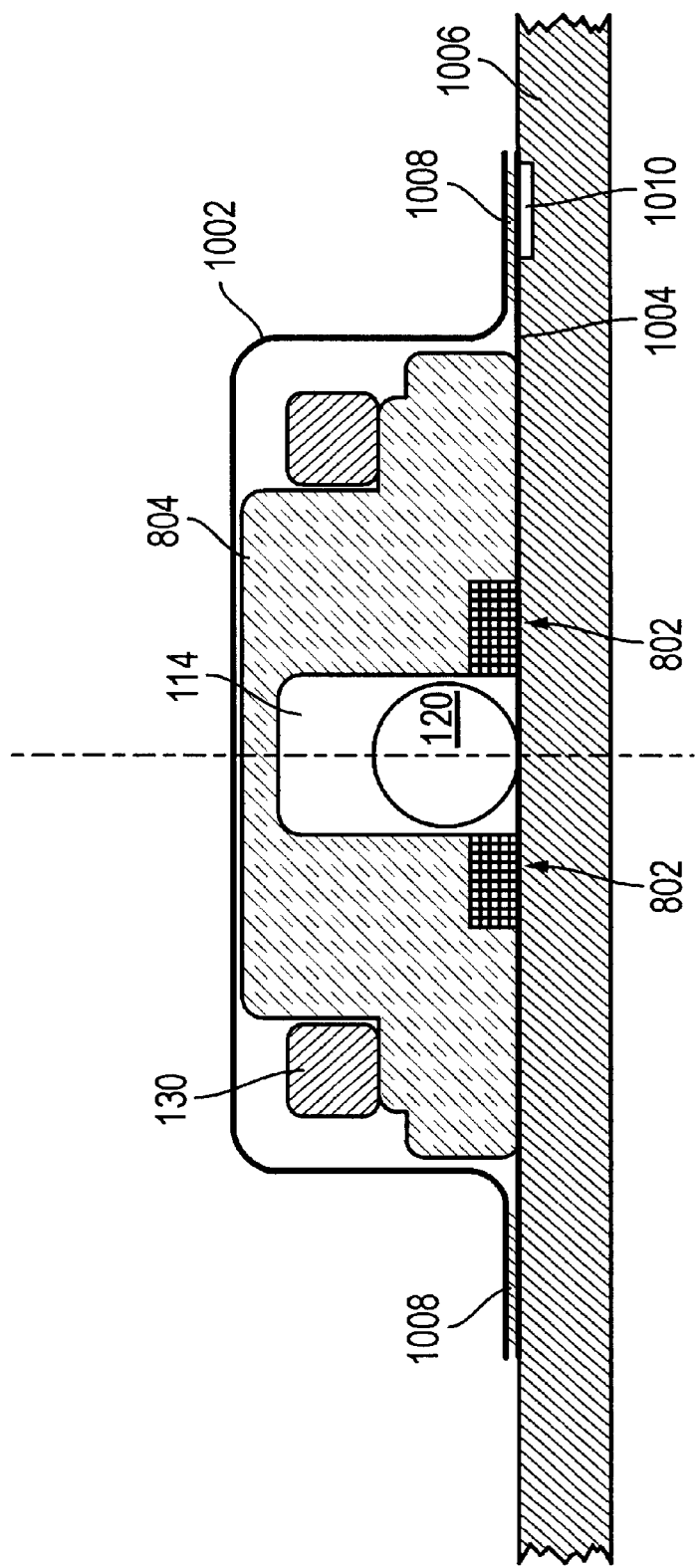
FIG. 10 is a cross-sectional view of a third embodiment.

FIG. 10 is a cross-sectional view of a third embodiment. As shown, the sensor is enclosed in an electrically conductive shield to seal in electromagnetic interference radiation and eliminate the noise source of a high frequency and high inductance device. Copper or aluminum (plated or clad) may be used. For example, solder-clad aluminum allows easy soldering. As shown, the shield is in two pieces. Top 1002 is mounted to bottom 1004 which, in turn, is mounted on circuit board 1006. Top 1002 is attached to bottom 1004 using solder 1008. The shield is attached to board 1006 using conventional surface mount technology (e.g., solder) that both holds the sensor in place and electrically couples the shield to electrical ground pad 1010. The shield shown is illustrative, and many variations are possible (e.g., using conductive epoxy).

In one embodiment the coils are coupled to electrically conductive traces on the board using conventional through-hole connections. Alternatively, a surface mount to adjacent bonding pads using, for example, ultrasonic bonding is implemented.

Although specific embodiments have been described, persons reviewing this description will understand that many variations exist. The scope of invention is therefore limited only by the following claims.

We claim:

1. A sensor comprising:
   a body in which a bore is defined along an axis, wherein the bore has a first end and a second end distal from the first end;
   a mass positioned within the bore, wherein the mass is subject to magnetic attraction;
   a magnet positioned adjacent the second end of the bore so as to impart a magnetic attraction on the mass; and
   an electrically conductive coil positioned adjacent the first end of the bore;
   wherein as a component force of gravity along the axis and with reference to the body is reduced, the magnetic attraction on the mass moves the mass from the first end to the second end.

2. The sensor of claim 1 further comprising a circuit electrically coupled to the coil, wherein the circuit detects a change in inductance of the coil as the mass moves within the bore.

3. The sensor of claim 2 wherein the circuit comprises an output terminal at which a signal is output indicating the mass has moved within the bore.

4. The sensor of claim 1 wherein the magnet is ring-shaped and positioned around the axis.

5. The sensor of claim 1 wherein the magnet is mounted on the body.

6. The sensor of claim 1 wherein the magnet is an electromagnet.

7. A sensor comprising:
   a body in which a bore is defined along an axis, wherein the bore has a first end and a second end distal from the first end;
   a mass positioned within the bore, wherein the mass is subject to magnetic attraction;
   a magnet positioned adjacent,the second end of the bore so as to impart a magnetic attraction on the mass; and
   an electrically conductive coil positioned adjacent the first end of the bore;
   wherein movement of the mass within the bore is limited such that a first magnetic force on the mass is greater than zero percent (0%) of a weight of the mass for the mass positioned adjacent the first end of the bore, and a second magnetic force on the mass is less than 100 percent (100%) of the weight of the mass for the mass positioned adjacent the second end of the bore.

8. The sensor of claim 7 wherein the first magnetic force is at least fifty percent (50%) of the weight of the mass.

9. The sensor of claim 1, wherein the body is mounted on a printed circuit board, and the coil includes an electrically conductive trace defined in the circuit board.

10. The sensor of claim 1, wherein the body is mounted on a printed circuit board, and the coil includes a plurality of electrically conductive traces defined on different layers of the circuit board.

11. The sensor of claim 1 wherein the coil is mounted in the body.

12. The sensor of claim 1 wherein the coil is ring-shaped and positioned around the axis.

13. The sensor of claim 1 further comprising an electrically conductive shield surrounding at least a portion of the coil.

14. The sensor of claim 1 further comprising a liquid in the bore.

15. The sensor of claim 1, wherein movement of the mass within the bore is limited such that a first magnetic force on the mass is greater than zero percent (0%) of a weight of the mass for the mass positioned adjacent the first end of the bore, and a second magnetic force on the mass is less than 100 percent (100%) of the weight of the mass for the mass positioned adjacent the second end of the bore.

16. A portable computer in which a sensor is mounted comprising:
   a housing for the portable computer;
   a body, mounted inside the housing, in which a bore is defined along an axis, wherein the bore has a first end and a second end distal from the first end;
   a mass positioned within the bore, wherein the mass is subject to magnetic attraction;
   a magnet positioned adjacent the second end of the bore so as to impart a magnetic attraction on the mass; and
   an electrically conductive coil positioned adjacent the first end of the bore;
   wherein as a component force of gravity along the axis and with reference to the body is reduced, the magnetic attraction on the mass moves the mass from the first end to the second end.

17. The computer of claim 16 further comprising a circuit electrically coupled to the coil, wherein the circuit detects a change in inductance of the coil as the mass moves within the bore.

18. A computer hard disk drive assembly comprising:
   a housing for the disk drive assembly;
   a body, mounted inside the housing, in which a bore is defined along an axis, wherein the bore has a first end and a second end distal from the first end;
   a mass positioned within the bore, wherein the mass is subject to magnetic attraction;
   a magnet positioned adjacent the second end of the bore so as to impart a magnetic attraction on the mass; and
   an electrically conductive coil positioned adjacent the first end of the bore;
   wherein as a component force of gravity along the axis and with reference to the body is reduced, the magnetic attraction on the mass moves the mass from the first end to the second end.

19. The assembly of claim 18 further comprising a circuit electrically coupled to the coil, wherein the circuit detects a change in inductance of the coil as the mass moves within the bore.

20. A method of detecting a change in position of a mass, comprising:
   positioning the mass within a bore defined along an axis in a body, wherein the bore has a first end and a second end distal from the first end, and wherein the mass is subject to magnetic attraction;

positioning a magnet adjacent the second end of the bore so as to impart a magnetic force on the mass; and positioning an electrically conductive coil adjacent the first end of the bore;

wherein positioning the mass and the magnet is such that as a component force of gravity along the axis and with reference to the body is reduced, the magnetic attraction on the mass moves the mass from the first end to the second end.

21. The method of claim 20 further comprising outputting a signal upon detecting movement of the mass.

22. The method of claim 20 wherein the magnet is ring-shaped.

23. The method of claim 20 wherein the magnet is mounted on the body.

24. The method of claim 20 wherein the magnet is an electromagnet.

25. The method of claim 20, wherein movement of the mass within the bore is limited such that a first magnetic force on the mass is greater than zero percent (0%) of a weight of the mass for the mass positioned adjacent the first end of the bore, and a second magnetic force on the mass is less than 100 percent (100%) of the weight of the mass for the mass positioned adjacent the second end of the bore.

26. The method of claim 25, wherein the first magnetic force is at least fifty percent (50%) of the weight of the mass.

27. The method of claim 20, wherein the body is mounted on a printed circuit board, and the coil includes an electrically conductive trace defined in the circuit board.

28. The method of claim 20, wherein the body is mounted on a printed circuit board, and the coil includes a plurality of electrically conductive traces defined on different layers of the circuit board.

29. The method of claim 20, wherein the coil is mounted in the body.

30. The method of claim 20 further comprising shielding the coil by surrounding at least a portion of the coil with an electrically conductive shield.

31. The method of claim 20 further comprising damping motion of the mass by placing a liquid in the bore.

* * * * *